3,320,205
METHOD OF MANUFACTURING SPINNING SOLUTIONS OF MIXED VINYL CHLORIDE AND ALPHA-METHYLSTYRENE POLYMERS
Kiyokazu Imai, Osamu Fukushima, and Sadamaru Miyazaki, Kurashiki, Japan, assignors to Kurashiki Rayon Company Limited, Kurashiki, Japan, a corporation of Japan
No Drawing. Filed June 27, 1963, Ser. No. 290,922
Claims priority, application Japan, July 28, 1962, 37/31,890
2 Claims. (Cl. 260—33.6)

The present invention relates to a method of manufacturing a spinning solution for the manufacture of mixed filaments consisting of vinyl chloride polymer and α-methylstyrene polymer.

For the preparation of a spinning solution it is a common method to use previously separated and dried solid polymers and dissolve them in a solvent thereof. The polymerization of α-methylstyrene is usually effected by a solution polymerization, yet the process to separate and dry the polymer from such process is very troublesome.

The principal object of the invention is to obviate the above disadvantages and to provide an excellent spinning solution at lower cost.

According to this invention α-methylstyrene or a mixture consisting essentially of α-methylstyrene is polymerized in an aromatic hydrocarbon and after being properly condensed, i.e., without separating and drying, it is mixed with a polymer vinyl chloride polymer system and a suitable solvent which can dissolve the system, thereby dissolving all of the polymers uniformly. The vinyl chloride polymers used were a solution of condensed product of a suitable solution polymer instead of isolated and dried solid polymers. In preparing the spinning solution a solid polymer isolated from the polymer system was not used. It is self-evident that this method is more inexpensive and advantageous in industrial process if compared with a method using a conventional isolated solid polymer. The solvent to be added to the condensed solution is not only limited to a common solvent by itself for both of α-methylstyrene polymers and vinyl chloride polymers but also such a solvent may be used which can be a common solvent for both polymers in a mixed condition with aromatic hydrocarbons, which includes tetrahydrofuran, dioxane, cyclohexanone, ethylene dichloride, chloroform, acetone, methyl ethyl ketone, diethyl ketone, dimethyl formamide, and carbon disulphide. As the aromatic hydrocarbons used is made of benzene, toluene, xylene, ethyl benzene, cumene and halogen derivatives thereof. The concentration of the polymer in said condensed polymerized paste can not be specially limited, yet 20%, preferably more than 30% may be used.

α-methylstyrene polymers and vinyl chloride polymers to be used for the mixture are not necessarily limited to a homopolymer, but a copolymer essentially consisting of α-methylstyrene or vinyl chloride may be used. As comonomers of α-methylstyrene use is made of styrene, vinyl toluene, vinyl xylene, methoxy styrene, chlorostyrene, dichlorostyrene, trichlorostyrene, p-methyl-α-methylstyrene, vinyl naphthalene, acenaphthylene, vinyl cyclohexane, vinyl pyridine, and alkyl vinyl pyridine and the like cyclic compounds, ethylene, propylene, isobutene, butadiene, isoprene and chloroprene and the unsaturated hydrocarbons as well as alkyl vinyl ether, halogenized vinyl ether and the like vinyl ethers. As comonomers of vinyl chloride, vinylidene chloride, vinyl fluoride and the like unsaturates; acrylonitrile, vinylidene cyanide, methyl-acrylate, methyl methacrylate and the like general acrylic acids; vinyl acetate, vinyl stearate, and the like vinyl esters; the above cyclic vinyl compounds; the above unsaturated hydrocarbons and said vinyl ethers may be used.

To the mixed spinning solution, may be added pigment, stabilizer, if necessary.

The invention will be further described in detail by way of an example of the practice thereof.

To a mixed solution of 20 parts of α-methylstyrene and 80 parts of toluene were added at a temperature of $-78°$ C., while stirring, 0.4 part of a mixed solution of boron trifluoride-diethyl ether complex and 0.8 part of chloroform as polymerization catalyst and the polymerization reaction effected for 4 hours which yielded 100% of poly-α-methylstyrene having intrinsic viscosity (in toluene at 30° C.) of 1.56 dl./g. 500 g. of polymerized paste thus obtained was charged in a ceramic beaker of 1 lit. capacity which was kept in a hot oil bath in air for 6.5 hours without stirring to yield a condensate of 100 g. (50%) of poly-α-methylstyrene and 100 g. (50%) of toluene. This condensate is colorless and the poly-α-methylstyrene in the condensate had the intrinsic viscosity of 1.52 which coincides with the value of 1.56 before the condensation within a test error so that no splitting of poly-α-methylstyrene occurred during the condensation operation. 60 g. of the condensed solution consisting of poly-α-methylstyrene thus obtained and toluene at the ratio of 1:1, 70 g. of polyvinyl chloride (polymerization degree 1,450) and 558 g. of tetrahydrofuran were mixed and homogeneously dissolved to obtain a mixed spinning solution having a concentration of 17%.

The mixed spinning solution was extruded through a spinneret of 0.2 mm. dia. into water and the filament was taken up at a speed of 10 m./mm. when departing from the bath, then subjected to cold stretch for 350% in warm water, then dried and heat set for 60 seconds in air at 150° C.

The filament thus obtained showed no coloration and had typical properties of 1.5 dr. fineness, 4 g./d. tenacity, 3% elongation, 120° C. softening point in water, 185° C. dry softening point. Comparing with the filament when using powdered poly-α-methystyrene almost no substantial difference could be recognized in the stability of the spinning solution, spinnability, elongation and other physical properties as well as the whiteness of the filament.

What we claim is:
1. A method of manufacturing spinning solutions which comprises solution polymerizing α-methylstyrene in an aromatic solvent, selected from the group consisting of benzene, toluene, styrene, ethylbenzene, cumene and halogenated derivatives thereof, then removing solvent to a polymer concentration of at least 20%, thereafter adding thereto polyvinyl chloride and a common solvent for the mixture of poly-α-methylstyrene and polyvinyl chloride.

2. The method of claim 1 wherein the α-methylstyrene is homopolymerized and wherein the polyvinyl chloride is a homopolymer.

References Cited by the Examiner
UNITED STATES PATENTS

| | | | |
|---|---|---|---|
| 2,616,869 | 11/1952 | Heisenberg et al. | 260—30.4 |
| 2,686,169 | 9/1954 | Ham | 260—30.4 |
| 2,847,271 | 9/1958 | Siclari et al. | 260—30.4 |
| 3,110,548 | 11/1963 | Fukushima et al. | 260—33.6 |

MORRIS LIEBMAN, *Primary Examiner.*
L. T. JACOBS, *Assistant Examiner.*